United States Patent [19]

Saito et al.

[11] Patent Number: 4,962,578
[45] Date of Patent: Oct. 16, 1990

[54] RESIN CALENDER ROLL

[75] Inventors: Yuji Saito, Urawa; Kazuo Yamada, Kawasaki; Akiyoshi Inoue; Yasuhiro Takaoka, both of Yokohama, all of Japan

[73] Assignee: Kinyosha Co., Ltd., Tokyo, Japan

[21] Appl. No.: 309,668

[22] PCT Filed: Jun. 10, 1987

[86] PCT No.: PCT/JP87/00369
§ 371 Date: Feb. 2, 1989
§ 102(e) Date: Feb. 2, 1989

[87] PCT Pub. No.: WO88/09846
PCT Pub. Date: Dec. 15, 1988

[51] Int. Cl.$^5$ .............................................. B21B 31/08
[52] U.S. Cl. ........................................ 29/132; 428/906
[58] Field of Search ................... 29/110, 132; 428/906, 428/422.8, 474.4

[56] References Cited

U.S. PATENT DOCUMENTS

| | | | |
|---|---|---|---|
| 3,216,846 | 11/1965 | Hendricx et al. | 427/130 |
| 3,398,011 | 8/1968 | Neirotti et al. | 427/130 X |
| 3,757,398 | 9/1973 | Urban | 29/132 X |
| 4,066,585 | 1/1978 | Schepp et al. | 528/336 X |
| 4,100,326 | 7/1978 | Somezawa et al. | 427/128 X |
| 4,118,533 | 10/1978 | Hipchen et al. | 428/426 X |
| 4,128,673 | 12/1978 | Watanabe et al. | 427/128 X |
| 4,256,034 | 3/1981 | Kusters et al. | |
| 4,324,177 | 4/1982 | Tswi et al. | 427/130 X |
| 4,368,240 | 1/1983 | Nauta et al. | 428/412 X |
| 4,438,063 | 3/1984 | Suguri et al. | 29/132 X |
| 4,466,164 | 8/1984 | Tadokoro et al. | 29/132 |
| 4,597,794 | 7/1986 | Ohta et al. | |

FOREIGN PATENT DOCUMENTS

| | | |
|---|---|---|
| 104611 | 10/1974 | Japan . |
| 51895 | 4/1980 | Japan . |
| 57-118898 | 7/1982 | Japan . |
| 57-191391 | 11/1982 | Japan . |
| 59-42119 | 10/1984 | Japan . |
| 2057092 | 3/1981 | United Kingdom ................. 29/132 |

Primary Examiner—Mark Rosenbaum
Assistant Examiner—Frances Chin
Attorney, Agent, or Firm—Nixon & Vanderhye

[57] ABSTRACT

A calender roll according to this invention requires no pre-operation, and has excellent heat and pressure resistance. In addition, the roll generates only a small amount of heat upon rotation, and can prevent scattering of a resin upon breakage. The roll of this invention is suitable to a resin calender roll such as a papermaker's calender roll.

6 Claims, 1 Drawing Sheet

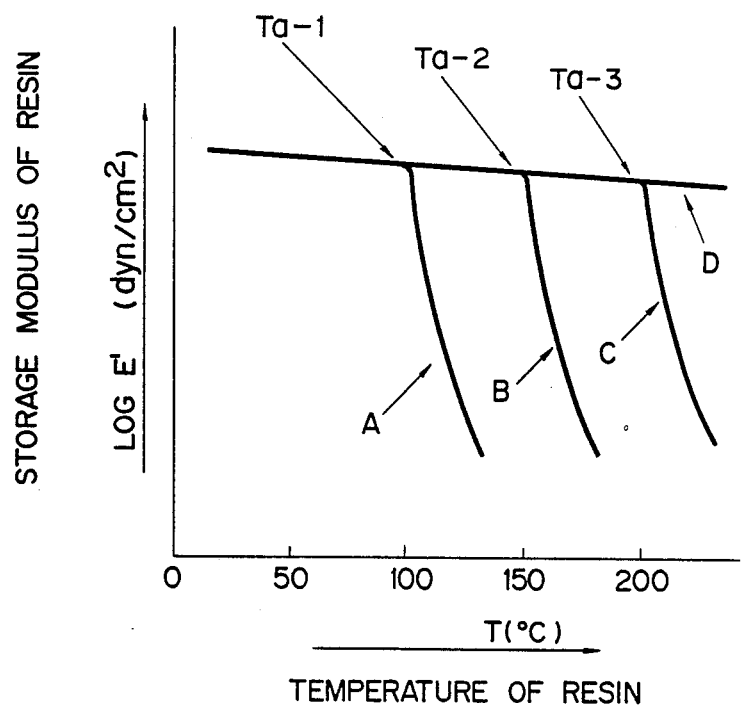

RESIN CALENDER ROLL

TECHNICAL FIELD

The present invention relates to a resin calender roll, such as a papermaker's calender roll, a textile calender roll, a magnetic tape calender roll, and the like.

PRIOR ART

Conventionally, a so-called cotton roll, paper roll, woolen roll, and the like of cotton wool, cotton, absorbent cotton, paper, wool, and the like have been used as papermaker's calender rolls.

Rolls utilizing these materials have a nonuniform hardness since they are aggregates of fibers. Therefore, when actually used, the hardness of the roll surface is made uniform to some extent by pre-operation. However, the operation for making the hardness of the surface uniform takes a considerable length of time. In these rolls using the fibers, internal heat generation during operation is large, and the interior of the roll is burnt and cannot be used any longer if the roll is operated at high rotational speed and pressure. If a problem such as web breakage occurs, paper sheets being treated become wrinkled, and are calendered overlying each other. If this happens, since the roll has poor recovery property, a paper trace remains on the roll surface, which damages the following paper sheets. Similarly, when a large-width sheet is treated after a small-width sheet has been treated, the edge portion of the small-width sheet directly influences the large-width sheet. For this reason, a plurality of auxiliary rolls are provided, the rolls being exchanged each time the sheet width is changed. If the surface of a roll has been damaged by overlying sheets, the roll is then re-ground.

A roll using a so-called thermoplastic monomer casting nylon is also used. This roll generates a large amount of heat and reaches a high temperature upon polymerization. Also, this type of roll has a large amount of molding shrinkage. Therefore, the roll must be prepared by fitting a hollow resin pipe on the surface of a metal core or mandrel directly or through an underlying layer such as urethane rubber. In the case of this roll, the metal core or the underlying layer is not adhered to the resin layer. For this reason, the resin layer is broken when this roll does not withstand high-speed rotation at high pressure. The fragments of the layer scatter and damage equipment, and may cause an accident involving personnel.

DISCLOSURE OF THE INVENTION

A calender resin roll according to the present invention is characterized in that the temperature of a characteristic inflection point of a storage modulus (E') of resin forming a surface layer adhering on a metal core is higher than the temperature corresponding to the sum of the resin temperature during operation and 10° C., and is lower than the temperature corresponding to the sum of the resin temperature during operation and 80° C., and the Shore D hardness of the resin falls within the range of 75 to 97.

The resin forming the surface layer can be any material which is in a liquid phase during molding, in order to facilitate the molding of a large roll, so that it can be injected in a mold and can be molded into a roll, and which can satisfy the requirements of the temperature of the characteristic inflection point of the storage modulus (E') and the Shore D hardness. More preferably, the resin should generate a small amount of heat upon crosslinking reaction, so that it can be easily formed on the adhesive layer, which is formed on the metal core. Examples of the resin include, a polyurethane resin, a polyisocyanurate resin, a crosslinked polyesteramide resin, or an epoxy resin.

The reason why the temperature range of the characteristic inflection point of the storage modulus (E') is determined to be higher than the temperature corresponding to the sum of the resin temperature during operation and 10° C. and to be lower than the temperature corresponding to the sum of the resin temperature and 80° C. is as follows:

In the case of the former temperature, it can be theoretically set to be higher than the resin temperature during operation. However, in practice, if the resin temperature exceeds the temperature of the characteristic inflection point of the storage modulus (E') of resin due to the kind of equipment in which a calender roll is used and also work conditions, the resin is immediately softened. In order to prevent this phenomenon, the 10° C. range is added to the temperature which the resin layer has during operation. In the case of the latter temperature, if the temperature exceeds the sum of the resin temperature and 80° C. and if the conditions under which the calender roll is operating are severe,—e.g., at high pressure and at high rotational speed—local heat generation occurs and the heated portion expands. Further, if a load is concentrated on the heated portion, abnormal heat generation occurs. However, within such a high temperature range, the resin is not softened but is instead expanded, with the result that a large crack may form in the resin layer (surface layer), due to the local load concentration, and finally, the resin layer may eventually break up and scatter. In order to prevent this phenomenon, the latter temperature range is set.

It should be noted that the characteristic inflection point of the storage modulus (E') of resin is the point at which the storage modulus greatly decreases while the resin is transiting from a glass state to a rubber state. This point is measured while changing a temperature at a constant frequency by using a visco-spectrometer. The constant frequency normally falls within the range of 10 to 50 Hz. The rate of increase in temperature is normally set to be 2° C./min.

More specifically, in the calender roll of the present invention, even if abnormal heat generation occurs locally on the roll surface, due to overly severe operating conditions, the temperature of the characteristic inflection point of the storage modulus (E') still falls within the predetermined range. Therefore, the heated portion softens at the beginning of thermal expansion, with the result that load concentration can no longer occur. If the heated portion is broken, only hair cracking occurs on the surface of the resin layer and the layer does not break up and scatter. For this reason, the resin layer is broken by local heat generation, the layer will not scatter, and a personnel accident can be prevented.

The reason why the Shore D hardness of the resin is set to fall within the range of 75 to 97, and the hardness set to be 75 or more is as follows:

A calender roll normally operates at high pressure and at high rotational speed. If the hardness is lower than 75, a deformation degree of the resin is increased due to an operation pressure. As a result, the interior of the resin is heated and broken. Normally, since a hard resin has a low elongation at break, if it is used at high pressure, the elongation at break of the resin itself can't follow its deformation before heat generation, that it is broken.

The reason why the hardness is set to be 97 or less is to eliminate the following problem:

When a resin roll is used in a normal application, it is ground with a crown so as to uniformly contact a metal roll or an object to be treated. If the grinding precision is poor, a portion of the roll may receive the entire load during the roll operation. In this case, if the hardness is lower than Shore D 97, deformation occurs on whole region of the roll, as a result, there is no problem. However, if the hardness is high (exceeding 97), deformation degree is small, and a portion of the roll receives the entire load. This causes an overload state for the roll, and the resin layer is broken.

The operation of the calender resin roll of the present invention will now be described.

In general, if a roll coated with a hard resin is operated at high rotational speed in a high load state, local heat generation occurs. If the temperature of a metal roll contacting the resin roll is high, this phenomenon is noticeable.

In order to prevent this, in super calendering, crown-controlled rolls (swimming rolls) are used as upper and lower metal rolls, so that a uniform pressure is applied to the entire surface of the roll.

In on-machine calendering, a resin is coated on a crown-controlled roll (zone controlled roll), the surface temperature of the roll is detected by a sensor, and if local heat generation occurs, a pressure at the corresponding portion is decreased, and the roll is used with another crown.

However, local heat generation occurs despite of such efforts.

If the local heat generation occurs, the corresponding portion of the resin is thermally expanded and projects. A concentrated load acts on the projection, and this portion is further heated. Thus, a temperature of this portion is increased by repetition of this phenomenon.

This will be explained with reference to the drawing.

The drawing shows the relationship between the storage modules (E') of resin and a resin temperature T. In general, a thermosetting resin has a characteristic inflection point Ta(Ta-1, Ta-2, Ta-3, see FIG. 1). If the temperature exceeds this inflection point, a storage modulus is immediately decreased.

Assume that a resin roll is operated at a resin temperature of 80° C. In the case of composition A, if local heat generation occurs and if the temperature of the corresponding portion exceeds 100° C., the corresponding portion of the resin is softened and no longer receives a load. Thus, a load acts on the other portion of the roll surface which is free from the local heat generation. For this reason, an increase in temperature due to the local heat generation is stopped at a given temperature, and this does not result in roll breakage Since the resin has a small elongation at break, when a force is applied to the roll or a rotation speed of the roll or the temperature of the roll is increased in this state, only hair cracking occurs at the locally heated portion without the resin being scattered.

In the case of composition B, it's inflection point Ta-2 is present at 160° C. So, the following things can be said in comparison of composition A and B: Due to the fact that composition B has a larger thermal expansion at its locally heated portion than the locally heated portion of composition A, the depth of a hair crack in composition B is larger than that of composition A and extends so as to reach an adhesive layer. In this invention, the resin would not scatter since the resin is adhered on a metal core.

In the case of composition C, inflection point Ta-3 is 200° C., and hence, a temperature of the locally heated portion exceeds 200° C. For this reason, the resin has an even larger thermal expansion than compositions A and B, and the depth of a crack is also larger. Therefore, the resin is scattered. In this case, the resin may also suffer thermal decomposition because the resin temperature exceeds 200° C.

In the case of composition D, no inflection point is present previous to 250° C. Therefore, the extent to which the resin is scattered is greater than in composition C.

The conditions under which a resin does not scatter have been determined from a large number of tests.

As a result, it was concluded that characteristic inflection point Ta of the resin must be higher than a resin temperature during practical operation within the range of 10° C. to 80° C.

Note that the example of composition A corresponds to Example 1, and the example of composition B corresponds to Examples 3 and 4. Example 2 uses an intermediate composition of these examples. Examples of compositions C and D correspond to Comparative Examples 1 and 2.

The embodiments of the invention in which an exclusive property or privilege is claimed are defined as follows:

The drawing is a graph showing the relationship between a storage modulus of a resin and a resin temperature during operation.

BEST MODE OF CARRYING OUT THE INVENTION

The present invention will now be described by way of its examples.

EXAMPLE 1

A casting mold was prepared through which an iron core, the surface of which was subjected to a blast treatment and was applied with an adhesive (trade name: Conap 1146, available from Conap Corp, a phenol-based adhesive), was inserted. 100 parts by weight of Sunnix HD402 subjected to dehydration at a temperature of 120° C. were charged into a mixing machine, and 100 parts by weight of Millionate MT and 200 parts by weight of dried Crystallite A-1 (available from K.K. Tatsumori, a quartz powder) were added thereto. The mixture was stirred at a reduced pressure for 5 minutes. The resultant mixture was injected into the casting mold, and was heated at 90° C. for 5 hours to be cured. The resultant cured product was taken out from the mold and was subjected to conventional surface grinding. Thus, a calender roll of Example 1 having a hard polyurethane resin layer formed on the iron core was obtained.

The values of the Shore D hardness, the tensile strength, and the elongation at break of the hard polyurethane resin layer were as shown in Table 1 below. The Sunnix HD402 was polyether polyol available from Sanyo Chemical Industries, LTD, and had a hydroxyl value of 394.

The Millionate MT was diphenylmethane diisocyanate available from Nippon Polyurethane Industry Co., LTD., and had an isocyanate (NCO) content of 33.6%.

mold, and was subjected to conventional surface grinding, thus obtaining a roll of Example 4. Note that the general formulas of ELM-434 and HN-2200 are as follows:

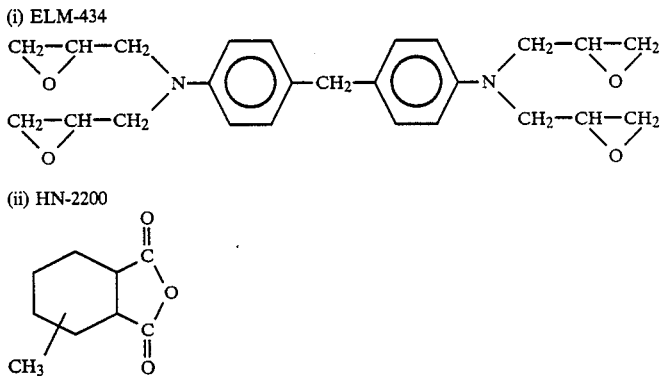

(i) ELM-434

(ii) HN-2200

EXAMPLE 2

A casting mold was prepared through which an iron core, the surface of which was subjected to a blast treatment and applied with an adhesive, was inserted. 75 parts by weight of 1,3-bis(2-oxazonyl-2)benzene, 25 parts by weight of adipic acid, and 1 part by weight of triphenyl phosphite were mixed in a solution bath, and were perfectly dissolved at 130° C. The mixture was stirred at reduced pressure. The resultant mixture was injected into the preheated casting mold, and was cured at 200° C. for 30 minutes, and was then cooled. The resultant cured product was taken out from the mold. Thereafter, the product was subjected to conventional surface grinding, thus obtaining a calender roll of Example 2. The values of Shore D hardness, the tensile strength, and the elongation at break of this calender roll were also as shown in Table 1 below.

EXAMPLE 3

A casting mold as in Example 2 was prepared. Then, 66.1 parts by weight of 4.4'-methylene bis(2-chloroaniline) was heated and melted at 120° C. The molten 4.4'-methylene bis(2-chloroaniline) and 100 parts by weight of Coronate EH (trade name: available from Nippon Polyurethane Industries Co., LTD.), which is preheated at 50° C. were mixed and stirred under a pressure less than 1 atom, thereby forming a mixture. This mixture was pored into the mold, then heated at 120° C. for 4 hours, and thereby cured. The resultant cured product was taken out from the mold, and was subjected to conventional surface grinding to obtain a calender roll of Example 3. The values of the Shore D hardness, the tensile strength, and the elongation at break of this calender roll were also as shown in Table 1 below.

EXAMPLE 4

A casting mold through which an iron core subjected to a surface blast treatment was inserted was prepared. 100 parts by weight of Sumiepoxy ELM-434 (trade name: available from Sumitomo Chemical Co., LTD.) preheated to 90° C. and 80 parts by weight of HN5500E (trade name: available from Hitachi Chemical Co., Ltd.) preheated to 90° C. were stirred at reduced pressure. The mixture was injected in the mold preheated to 90° C. and was heated and cured under the conditions of 90° C., 2 hours and 120° C., 2 hours and 150° C., 4 hours. The resultant cured product was taken out from the Calender rolls of Comparative Examples 1 to 3 which were prepared for comparison with Examples 1 to 4 will now be explained.

COMPARATIVE EXAMPLE 1

A casting mold as in Example 1 was prepared. 100 parts by weight of Millionate MT and 40 parts by weight of PPG DIOL 2000 (trade name; available from Mitsui Toatsu Chemicals, Inc.) were melted and mixed at 60° C. 0.5 parts by weight of N,N',N''-tris(dimethylaminopropyl) hexahydro-s-triazine were added to the mixture, and the resultant mixture was stirred at reduced pressure. The mixture was injected into the mold, and was heated at 140° C. for 2 hours and was cured at 180° C. for 4 hours The resultant cured product was taken out from the mold, and was subjected to conventional surface grinding, thereby obtaining a calender roll of Comparative Example 1.

COMPARATIVE EXAMPLE 2

A casting mold as in Example 1 was prepared. Then, 100 parts by weight of Millionate MT and 40 parts by weight of PPG DIOR 2000 were melted and mixed at 60° C. 100 parts by weight of dried Crystallite A-1 were added to the mixture. 0.5 parts by weight of N,N',N''-tris (dimethylaminopropyl)hexahydro-s-triazine were added to the mixture. The mixture was heated at 140° C. for 2 hours and was cured at 180° C. for 4 hours. The resultant cured product was taken out from the mold, and was subjected to conventional surface grinding, thereby obtaining a calender roll of Comparative Example 2.

COMPARATIVE EXAMPLE 3

A casting mold as in Example 1 was prepared. 90 parts by weight of Polycure IC-701 (trade name: available from Sanyo Chemical Industries, LTD; an isocyanate component) and 10 parts by weight of Polycure SU-101 (trade name: available from Sanyo Chemical Industries, LTD; a polyol component) in which 0.5 parts by weight of catalyst A (trade name: available from Sanyo Chemical Industries, LTD; an isocyanate trimerized catalyst) were pre-mixed were heated and mixed at 50° C. and at reduced pressure. The mixture was injected into the mold, and was heated and cured at 150° C. for 5 hours. The resultant cured product was taken out from the mold and was subjected to conventional surface grinding, thereby obtaining a calender roll of Comparative Example 3.

The values of Shore D hardness, the tensile strength, and the elongation at break of the calender rolls of Comparative Examples 1 to 3 were as shown in Table 1 below.

TABLE 1

|  | Example 1 | Example 2 | Example 3 | Example 4 | Comparative Example 1 | Comparative Example 2 | Comparative Example 3 |
|---|---|---|---|---|---|---|---|
| Hardness (Shore D) | 89 | 92 | 86 | 90 | 85 | 91 | 80 |
| Tensile Strength (kgf/cm²) | 800 | 1340 | 418 | 470 | 623 | — | 530 |
| Elongation at Break | 8 | 4 | 18 | 2 | 9 | — | 15 |

The roll breaking test, i.e., the heating, compressing, and rotating test, was conducted for the calender rolls of Examples 1 to 4 and Comparative Examples 1 to 3. The test results shown in Table 2 were obtained.

The roll breaking test was conducted using a combination of 300 mm (diameter)×300 mm (length) metal rolls whose surface temperature could be controlled, and the respective calender rolls. The dimensions of each calender roll were 160 mm (diameter)×140 mm (diameter)×100 mm (length). As shown in Table 2, the test was performed until the calender rolls were broken while changing the temperature, pressure, and rotational speed, and the broken states were examined.

As can be seen from Table 2, in the calender rolls of Examples 1 to 4, the resin layers were only cracked and scattering caused by breakage was not observed at all.

In contrast to this, it was found that in the calender rolls of Comparative Examples 1 to 3, the resin layers were completely broken and scattered. It was found that in the rolls of Examples 1 to 4, the inflection points fell within the range of 90 to 160° C. However, it was confirmed that in the rolls of Comparative Examples 1 to 3, the inflection points were high, i.e., exceeded 200° C.

TABLE 2

|  | Example 1 | Example 2 | Example 3 | Example 4 | Comparative Example 1 | Comparative Example 2 | Comparative Example 3 |
|---|---|---|---|---|---|---|---|
| Rotational Speed (r.p.m.) | 800 | 752 | 800 | 600 | 400 | 600 | 800 |
| Line Pressure (kgf/cm) | 200 | 300 | 300 | 200 | 180 | 300 | 200 |
| Temperature of Metal Roll (°C.) | 70 | 120 | 140 | 120 | 120 | 40 | 140 |
| Temperature of resin surface (°C.) | 60 | 90 | 120 | 110 | 100 | 30 | 110 |
| Temperature of Resin Surface Locally Heated Portion (°C.) | 115 | 130 | 180 | 185 | 200 or higher | 200 or higher | 200 or higher |
| State of Resin | cracked | cracked | cracked | cracked | scattered | scattered | scattered |
| Inflection Point (°C.) | 90 | 110 | 160 | 165 | 250 or higher | 250 or higher | 200 |

INDUSTRIAL APPLICABILITY

The present invention can be applied not only to a papermaker's calender roll but also to various other resin calender rolls such as a magnetic tape calender roll.

We claim:

1. A resin calendar roll having a metal core and a resin surface layer formed on the metal core, the resin having a storage modulus, wherein:
   the storage modulus of said resin of said resin surface layer has a characteristic inflection point whose temperature is 10°-80° C. higher than a temperature of the resin surface layer during operation of the resin calendar roll; and further wherein a Shore D hardness of the resin falls within the range of 75 to 97.

2. A calender resin roll according to claim 1, wherein the resin forming said surface layer is composed of a thermosetting resin.

3. A calender resin roll according to claim 1, wherein the resin forming said surface layer is composed of a polyurethane resin.

4. A calender resin roll according to claim 1, wherein the resin forming said surface layer is composed of a polyisocyanurate resin.

5. A calender resin roll according to claim 1, wherein the resin forming said surface layer is composed of a crosslinked polyesteramide resin.

6. A calender resin roll according to claim 1, wherein the resin forming said surface layer is composed of an epoxy resin.

* * * * *